United States Patent
Hayman et al.

(10) Patent No.: US 12,081,578 B2
(45) Date of Patent: Sep. 3, 2024

(54) METHOD AND SYSTEM FOR IDENTIFYING VULNERABILITY LEVELS IN DEVICES OPERATED ON A GIVEN NETWORK

(71) Applicant: Meir Hayman, Rishon Lezion (IL)

(72) Inventors: Meir Hayman, Rishon Lezion (IL); Nitzan Abu-Yitzhak, Rishon Lezion (IL)

(73) Assignee: Meir Hayman, Rishon Lezion (IL)

( * ) Notice: Subject to any disclaimer, the term of this patent is extended or adjusted under 35 U.S.C. 154(b) by 242 days.

(21) Appl. No.: 17/417,402

(22) PCT Filed: Dec. 11, 2019

(86) PCT No.: PCT/IL2019/051356
§ 371 (c)(1),
(2) Date: Jun. 23, 2021

(87) PCT Pub. No.: WO2020/136635
PCT Pub. Date: Jul. 2, 2020

(65) Prior Publication Data
US 2022/0060500 A1    Feb. 24, 2022

(30) Foreign Application Priority Data

Dec. 25, 2018  (IL) .......................................... 263958

(51) Int. Cl.
*H04L 9/40*        (2022.01)
(52) U.S. Cl.
CPC ................................ *H04L 63/1433* (2013.01)
(58) Field of Classification Search
CPC .................................................. H04L 63/1433
See application file for complete search history.

(56) References Cited

U.S. PATENT DOCUMENTS

| 8,095,982 | B1 * | 1/2012 | Guruswamy | ....... H04L 63/1433 709/224 |
| 8,127,353 | B2 | 2/2012 | Rittermann | |

(Continued)

OTHER PUBLICATIONS

PCT International Search report for International application No. PCT/IL2019/051356, dated Apr. 9 2020, 3pp.

(Continued)

*Primary Examiner* — Viral S Lakhia
(74) *Attorney, Agent, or Firm* — The Roy Gross Law Firm, LLC; Roy Gross

(57) ABSTRACT

The present invention discloses a method operable by a discovery system comprising at least one computerized device connected to an internet-protocol based network, the computerized device configured to operate a scan on a range of internet-protocol addresses and detect open ports available for communication. The discovery system is configured to generate an open port list denoted as first open port list of the open ports available for communication in the given range of the internet-protocol addresses and send request headers over an application protocol to at least one port of the ports in the first open port list and receive response headers comprising header fields from open ports available for communication in the range of internet-protocol addresses. The discovery system may be configured to utilize the header fields in a preconfigured data structure to identify device types, associate a test reference to the device type and preform the test accordingly to communicate with the identified open ports and determine vulnerability levels according to the test results.

16 Claims, 12 Drawing Sheets

(56) References Cited

U.S. PATENT DOCUMENTS

| | | | |
|---|---|---|---|
| 8,127,359 B2 | 2/2012 | Kelekar | |
| 8,316,447 B2 * | 11/2012 | Guruswamy | G06F 21/577 |
| | | | 726/25 |
| 8,887,284 B2 * | 11/2014 | Kovar | H04L 63/0227 |
| | | | 709/224 |
| 9,241,007 B1 | 1/2016 | Witter et al. | |
| 9,407,653 B2 * | 8/2016 | Nakawatase | H04L 63/1433 |
| 9,842,315 B1 | 12/2017 | Raman et al. | |
| 11,102,231 B2 * | 8/2021 | Kraning | H04L 67/10 |
| 11,113,405 B2 * | 9/2021 | Hodgman | H04L 63/08 |
| 11,429,724 B2 * | 8/2022 | Bargury | H04L 63/1408 |
| 2005/0172019 A1 | 4/2005 | Williamson et al. | |
| 2005/0005169 A1 | 6/2005 | Kelekar | |
| 2006/0256729 A1 | 11/2006 | Chen et al. | |
| 2008/0276319 A1 | 11/2008 | Rittermann | |
| 2009/0007270 A1 | 1/2009 | Futoransky et al. | |
| 2012/0144493 A1 | 6/2012 | Cole et al. | |
| 2012/0151595 A1 | 6/2012 | McClure et al. | |
| 2015/0142564 A1 | 5/2015 | Lissack | |
| 2017/0353384 A1 * | 12/2017 | Chayat | G06F 9/45558 |
| 2018/0332136 A1 | 11/2018 | Narasimhan et al. | |
| 2019/0044866 A1 * | 2/2019 | Chilikin | H04L 69/22 |
| 2020/0007569 A1 * | 1/2020 | Dodge | H04L 41/22 |

OTHER PUBLICATIONS

PCT Written Opinion for International application No. PCT/IL2019/051356, dated Apr. 9 2020, 7pp.

PCT International Preliminarily Report on Patentability for International application No. PCT/IL2019/051356, dated Jun. 16, 2021, 8pp.

\* cited by examiner

METHOD AND SYSTEM FOR IDENTIFYING VULNERABILITY LEVELS IN DEVICES OPERATED ON A GIVEN NETWORK

FIELD OF THE INVENTION

The invention relates to the field of vulnerability assessment in computerized devices connected to communication network. More precisely, this invention refers to a method and system for assessing the vulnerability levels according to the device type operated in the communication network.

BACKGROUND OF THE INVENTION

A vulnerability assessment is the process of defining, identifying, classifying and prioritizing vulnerabilities in computer systems, applications and network infrastructures and providing a report comprising the assessment with the necessary knowledge. In some cases, the process of vulnerability assessment may initiate by a computerized system connected to the network and design to target specific devices. In such a case, the system configured to perform the vulnerability assessment may be designed to target specific devices, and/or specific addresses on the communication network. The vulnerability assessment involves the detection of potential unauthorized uses and associated exploits (collectively "vulnerabilities") as they relate to computer networks and the devices that connect to such networks. Network types can include, for example, the Internet, local area networks, and the like. Devices can include cameras, routers, switches, workstations, personal computers, printers, and other devices configured and designed to communicate within the network.

In some cases, such a vulnerability assessment process may require agents operating on the target devices. The agents can be designed and configured to facilitate the communications between the devices connected to the network, and a central system which conducts the vulnerability assessment process.

SUMMARY OF THE INVENTION

The present invention disclosed a method operable by a discovery system wherein the discovery system comprises at least one computerized device connected to an internet-protocol based network. The computerized device can be configured to scan a range of internet-protocol addresses, defined on the internet-protocol based network, and detect open ports available for communication in said internet-protocol addresses range. The discovery system disclosed at the present invention can operate by at least one computerized device which may comprise at least one processing unit coupled with at least one memory unit. The at least one processing unit can be configured with the instructions to receive the internet-protocol address range and operate a scan on the given range of internet-protocol addresses for detecting open ports available for communication. In some cases, the scan operation can be configured to be performed via at least one network interface device coupled with the at least one computerized device, wherein the at least one network interface device can be configured to communicate with the internet-protocol based network.

The discovery system is also configured to generate an open port list denoted as first open port list of the open ports available for communication in the given range of the internet-protocol addresses. In some cases, the discovery system may be configured to send request headers over an application protocol to at least one port of the ports in the first open port list. The discovery system may also be configured to receive back the header fields from the ports to which the request headers sent. The discovery system may also be configured to receive response headers comprising header fields from open ports available for communication in the range of internet-protocol addresses. In some cases, the open ports may be operated by devices operating in the internet-protocol based network. The discovery system may also be configured to extract some field headers associated with the responded open ports. Thus, the filed headers are extracted from the response headers received from the open ports operated by said devices.

The discovery system can also be configured generate an open port list denoted as second open port list comprising ports from the first open port list, wherein the ports from the second open port list are associated with header fields, port numbers, protocol names. In some cases, the discovery system may also be configured to identify a key field, out of the header fields received from the open ports. In such cases, the key field may be a predefined field configured in the discovery system.

In some embodiments of the present invention, the discovery system may be configured to utilize the header fields in a preconfigured data structure to identify device types, wherein the device types are the types of the devices operating the open ports. In some cases, the identification of the device types may be according to the key field. In some cases, the discovery system may be configured to perform at least two processes to complete the process of the device type identification. In such cases, the discovery system may utilize the key field to identify the device type, in case the key field has been received from the port. The discovery system may also be configured to utilize other header fields in case the key field has not been received from the port.

The discovery system disclosed herein may also be configured to generate an open list denoted as third open port list comprising ports from the second open port list, wherein the ports in the third open port list are associated with header fields, port numbers, protocol names, and device type. In some cases, the discovery system may also be configured to output the third open port list. Such an output can be to a display device, computer-readable memory, text digital file, printed file, and the like.

In some embodiments of the present invention, the discovery system may be configured to test the open port in the third open port list and thereby identify the vulnerability levels thereof. In such cases, the computerized system operated by the discovery system may be instructed to receive the third open port list and identify the test references for the ports in the third open port list. In some cases, the discovery system may be configured to utilize a preconfigured data structure comprises test references associated with test arrays associated with test instruction sets. In such cases, the test reference may indicate the test array, or in some cases, test arrays a port in the third open port list may undergo. The test array can refer to some test instructions which define the specific test the open port may undergo.

The discovery system may also be configured to generate a fourth open port list from the third open port list by associating test references to the ports in the third open port list. Upon obtaining the fourth open port list the discovery system may be instructed to test the port in the fourth open port list according to the test references associated thereof. The discovery system may also be configured to communicate with the ports in the fourth open port list and verify the test results, according to the instruction sets associated with the test arrays associated with the test reference associated with the ports in the fourth open port list. The discovery system may also be configured to generate a fifth open port list by associating the test results and the vulnerability levels to the ports in the fifth open port list. In some cases, the vulnerability levels may be determined according to the test results. For example, in case the test comprising connecting to a digital printer by using a certain username and password, the vulnerability level may be determined as high level, in case connecting to the digital printer with said certain username and password succeeded. In some cases, the discovery system may also be configured to output the fifth open port list. Such an output can be to a display device, computer-readable memory, text digital file, printed file, and the like.

The method disclosed herein can be operable on the discovery system for the purposes of scanning a range of internet-protocol addresses, detect open ports available for communication open ports and identify the device types which operate said open ports. Such a method can comprise a computerized process for operate a scan on the given range of internet-protocol addresses for detecting open ports available for communication. The scan operation can be performed via at least one network interface device configured to communicate with the internet-protocol based network. The method disclosed herein may also comprise instructions for generating a first open port list of the open ports available for communication in the range of internet-protocol addresses. The method disclosed herein may also comprise instructions for sending request headers over an application protocol to ports in the first open port list for receiving back the header fields from the ports to which the request headers sent. Then, headers comprising header fields from open ports available for communication in the range of internet-protocol addresses may be received.

The method disclosed herein may also comprise instructions for extracting field headers associated with the responded open ports, wherein the filed headers are extracted from the response headers received from the open ports operated by said devices. The method disclosed herein may also comprise instructions for generating a second open port list comprising ports from the first open port list, wherein the ports from the second open port list are also associated with header fields, port numbers, and protocol names. In some cases, the method disclosed herein may be configured to identify a key field, out of the header field received from the open ports. In such cases, the key field may be a predefined field configured in the discovery system.

The method disclosed herein may also comprise instructions for identifying device types by utilizing a data structure with the header fields, wherein the device types are the types of the devices operating the ports in the second open port list. In some cases, the identification of the device types may be performed according to the key field. In some cases, the method disclosed herein may be configured to perform at least two processes to complete the process of the device type identification. In such cases, the key field may be utilized to identify the device type, in case the key field has been received from the port. The method disclosed herein may be further configured to utilize other header fields in case the key field has not been received from the port. The method disclosed herein may also comprise instructions for generating a third open port list comprising ports from the second open port list, wherein the ports in the third open port list are associated with header fields, port numbers, protocol names, and device type. The method disclosed herein may also comprise instructions for outputting the third open port list. Such an output can be to a display device, computer-readable memory, text digital file, printed file, and the like.

The method disclosed herein may also comprise instructions for receiving the third open port list of ports available for communication in the range of internet-protocol addresses and identify variability levels thereof. The discovery system operating the method disclosed herein may also comprise at least one computerized device connected to an internet-protocol based network. The at least at least one computerized device may comprise at least one processing unit coupled with at least one memory unit. The method disclosed herein may also comprise instructions for identifying test references for the ports in the third open port list, by utilizing a data structure comprises test references associated with test arrays associated with test instruction sets. The method disclosed herein may comprise the instructions to associate test references to the ports in the third port list and generate a fourth open port list by associating test references to the port in the third open port list. In some embodiments of the present invention the method disclosed herein may comprise the instructions to conduct the tests, according to the test references in the fourth open port list. Upon completion the tests, according to the test references, the method disclosed herein may be instructed to communicate with the ports in the fourth open port list and verify the test results.

In some cases, the instructions for verifying the test results may be according to the instruction sets associated with the test arrays associated with the test reference associated with the ports in the fourth open port list. In some cases, the method disclosed herein may also comprise an evaluation process to determine the vulnerability levels according to the test results. For example, in case, a camera connected to a given network can be accessed and operated remotely without the need of user credentials, the vulnerability level of said camera may be High. The credentials of the user may be username and password, a token, and the like.

The method disclosed herein may also generate a fifth open port list by associating the test results and the vulnerability levels to the ports in the fifth open port list. In some cases, the discovery system may also be configured to output the fifth open port list. Such an output can be to a display device, computer-readable memory, text digital file, printed file, and the like. method disclosed herein.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Figure 1:
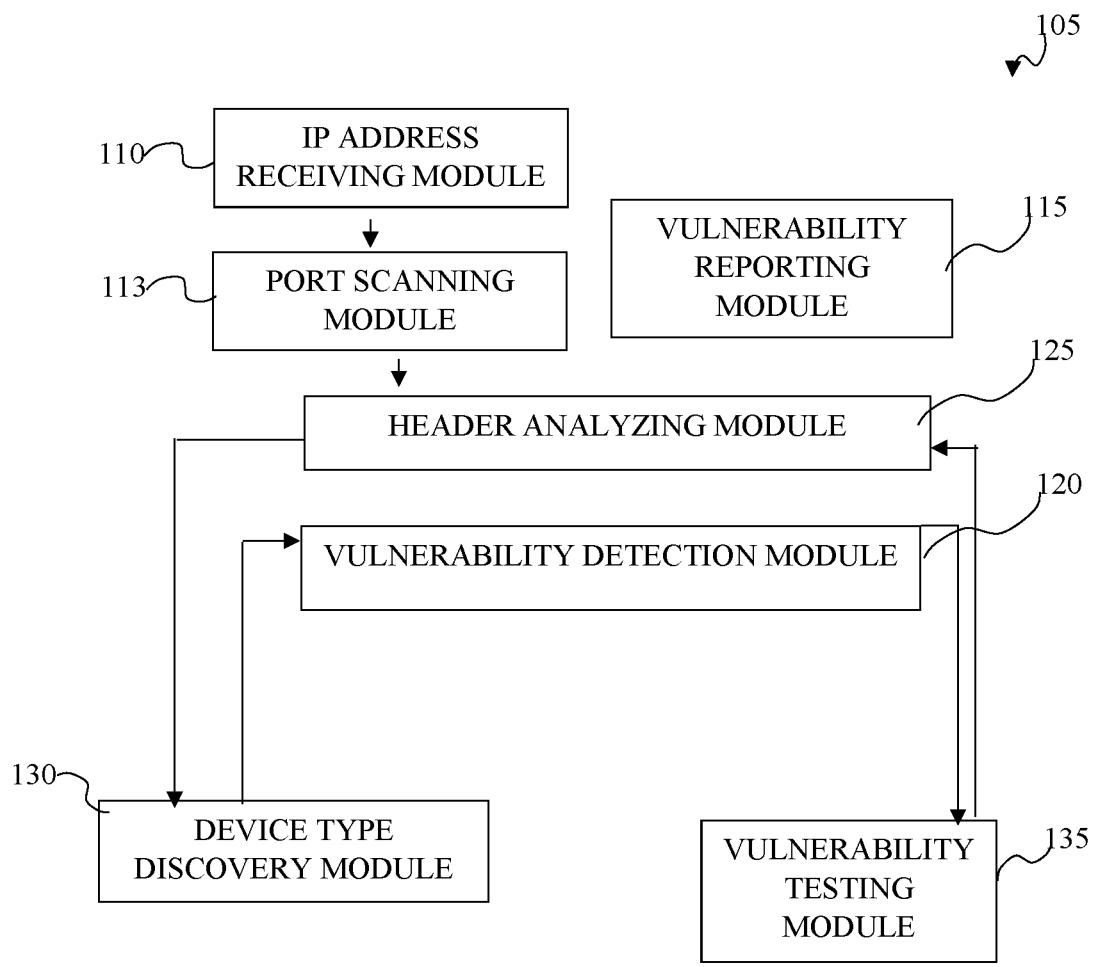
FIG. 1 shows a diagram of a discovery system configured to provide a vulnerability assessment on open ports, according to example embodiments of the present invention.

The present invention discloses a discovery method operable on a dedicated discovery system for vulnerability assessment in a given network. Such a vulnerability assessment method may be configured with the steps and processes required to accomplish detecting, discovering and determining the vulnerability levels of open ports available for communication in the given network. The given network defined herein as a range of Internet Protocol addresses, also known as IP addresses. The vulnerability assessment method disclosed herein can be configured to operate a port scanning for detecting open ports available for communication in the given network. The vulnerability assessment method can also be configured to discover and identify vulnerability levels on the detected open ports. In some cases, the open ports may be available to communicate over TCP and/or UDP protocols. The term vulnerability assessment refers to a process or a set of processes configured to operate for locating and reporting vulnerability level in the given network. The vulnerability levels can be assessed on open ports available for communication in a given network. The terms "ports available for communication" or "available for communication" refer herein to ports operable by a device operating on the internet-protocol based network and configured such that a computerized device and/or computerized device operable by a person can gain access to the open ports or to the services introduced by said ports. In some cases, gaining access to the services introduced by these ports may comprise, using a printer device on the network, utilized a shared computer resource on the network, sending commands to a device utilizing the open port to operate service on the network, getting information to a device via the open port, gaining information from a device via the open port, and the like.

The vulnerability level can be defined according to the results of the testing performed by the discovery system. Such tastings can be configured to test cases wherein an unwelcome perpetrator or unwanted intruder, such as a computerized device and/or a computerized device operable by a person can exploit the open ports. An exploit of an open port can be, gaining access to the open port, utilizing the computerized device introducing the open port by unwanted intruder, disabling the service introduced by the open port, making the open port as unavailable on the network, and the like. For example, the testing may comprise instructions to connect to an open port and in case the connection is successful, the vulnerability level of the connect open port may be high. In some other exemplary cases, the vulnerability level may be determined according to the connection method. Such an exemplary case can be wherein the testing comprises instructions to connect with a specific password. In such cases, the vulnerability level of the tested port may be medium or high, according to predefined definitions with which the discovery system is configured.

The vulnerability assessment operated by the discovery system may be designed to utilize application protocol in TCP and/or UDP based network. The term "application protocol" defined herein as protocols communicating over TCP and or UDP which make a use of protocol operating parameters of the network protocol. In some cases, the protocol operating parameters may be arranged as a block of information transferred as the payload arranged in headers, wherein the protocol operating parameters defined as header fields, of a request or response message. In some cases, the header fields may some data items or metadata items of the protocol parameters, such as Content-Type, Connection, Content-Length, Server, Date, and the like. In possible cases, protocols such as Hypertext Transfer Protocol (HTTP), Hypertext Transfer Protocol Secure (HTTPS), Real Time Streaming Protocol (RTSP), and the like, may be utilized to perform the vulnerability assessment. In such cases, the header fields may be structured in a form of attribute/value pairs, wherein the attribute is name of the field and the value is the value of the attribute. For example, the header may comprise a header field with the attribute Content-Length defining the length of the transferred message. The attribute Content-Length may be associated with the value 1110, referring to the size of the body of the response message.

FIG. 1 shows a diagram of a discovery system configured to provide a vulnerability assessment on open ports, according to example embodiments of the present invention. The system described in FIG. 1 shows a discovery system 105 embodied as a software application operable on a computerized device designed to be connected to a network. The network can be designed as a digital telecommunications network which allows computerized device to share resources and exchange information. The computerized device can be a personal computer such as, a tablet personal computer, a mobile device, a computerized server, and the like. The discovery system 105 may be designed with computer operable processes and instructions that when operated causes the computerized device to perform the vulnerability assessment to on a given network. The discovery system 105 comprises an IP address receiving module 110. The IP address receiving module 110 can be configured to receive a range of IP addresses for the vulnerability assessment. In some cases, the IP address receiving module 110 may be configured with a user interface which enables a person to select an IP address range. In some other cases, the IP address receiving module 110 may be configured to receive a list of IP addresses loaded or updated to the discovery system 105. Such a loading or updating can be by digital file such as a text file comprising the IP addresses defining the network. For example, a person can utilize a computer digital medium such as data storage device, memory stick, memory card, memory, computer parallel communication device, and like, to upload a text file to the IP address receiving module 110. Such a text file can comprise the IP addresses, or a range of IP addresses.

The discovery system 105 also comprises port scanning module 113 designed to receive a range of IP addresses and operate a scan for detecting open ports operable in the network defined by the received IP address range. The open ports detected by the port scanning module 113 can be endpoints of communication configured to accept IP communications, also known as IP packets. The open port can be operated and controlled by devices operated on the internet-protocol based network. The term "open port" as used herein is an endpoint configured to accept IP packets and terminate the communication at a hardware device. An "open port" in that matter is a port a configured to accept IP packets, wherein a "close port" is a port designed to reject connections or ignore IP packets directed thereto. In some cases, ports may be represented by a number, denoted as port number, which can be a logical construct representing a specific process, a type of network service, or a physical memory address in a network endpoint. The port scanning module 113 can be configured to scan a range of IP addresses, and detect the open ports in that IP address range.

The port scanning module 113 can also be configured to receive a plurality of open ports, which can be constructed as a first open port list, as a result of the port scanning. The port scanning module 113 can also be configured to send request messages for receiving the header fields from the first open port list. For example, the port scanning module 113 can send request headers over HTTP to an open port represented by the number 80, for receiving response headers comprising header fields from said open port. The port scanning module 113 may also associate the port number, the protocol name and the response header to the ports in the first open port list. The port scanning module 113 can also be configured to communicate with header analyzing module 125 for the purpose of analyzing the response headers. In such cases, the port scanning module 113 may send at least some of the ports in the first open port list to the header analyzing module 125, wherein the at least some of the ports in the first open port list are associated with response header, port number and protocol name.

The header analyzing module 125 can receive a list of open ports associated with response headers from the port scanning module 113. The header analyzing module 125 can also be configured to extract a list of specific fields from the response headers and associate these response headers with the open port with which the response headers is associated. In some cases, the header analyzing module 125 may also be configured to generate a second list of open ports, wherein the ports in the second open port list are associated with lists of header fields. Thus, the ports in the second open port list generated by the header analyzing module 125 may be associated with data item sets comprising the extracted header fields, the port number of the open port, the protocol name utilizing the open port and the Internet-Protocol address of the device which utilizes the open port. In some embodiments of the present invention, the header analyzing module 125 may also be configured to identify one of the header field, as a key field. For example, the header analyzing module 125 may be configured to identify a specific header field such a "Connection" as a key field, as elaborated below.

The discovery system 105 also comprises a device type discovery module 130 configured to receive a second open port list associated with data item sets such as, header fields, protocol name and a port number, and identify the device type accordingly. In some cases, the discovery module 130 may be configured to utilize data item sets which also comprise predefine key fields for identifying the device types. For example, the discovery module 130 may utilize a header field such as a "server name" referring to the computerized server in which the open port is operated. In some cases, the header field "server name" may be defined as a key field. The discovery module 130 may also utilize other data items of the data item sets such as the header fields, the protocol name and the port number of the open port, for identifying the device type. In some cases, the discovery module 130 may comprise a database configured to associate between a device type and a data item set comprising a protocol name, port number, header fields which are not the key field, and a key field. In some cases, the database of the discovery module 130 may be configured to associate the device type with date items sets which are not comprising the key field. The database of the discovery module 130 may embodied as a set of related data and information organized to allow determination of the device type, according to a specific collection of data items such as a key field, at least one header field, port number, protocol number. In some cases, such a database may be operable on a standalone computerized device communicating with the discovery module 130. In possible embodiments of the present invention, such a database may be an integrated part of the discovery module 130.

In some cases, the discovery module 130 may be configured with a database embodied as a set of related data and information organized to allow identification of the device type, according to a specific data item sets such as at least one header field, port number, protocol number, wherein the key field is not provided, nor identified. In such cases, a specific date item sets comprising, at least one header field, port number, protocol number, can be associated with more than one device type. For example, the port number 80, the protocol name HTTP, and specific header fields such as content-length and "content-type" may be matched to one more than one device type. In such cases, the discovery module 130 may be configured to select one device type and yield the selected device type as the result of the process.

In some cases, the selected device type associated with the open port number, the internet protocol name, and the header fields may be sent by the discovery module 130 to the vulnerability detection module 120. The vulnerability detection module 120 can be configured to receive the device type and the associated information thereof from the discovery module 130. The vulnerability detection module 120 can be configured to send the device type and the associated information thereof to the vulnerability module 135. The vulnerability testing module 135 can be configured to receive a device type associated with information comprising a device type, header fields, port number, protocol name, and the like, and perform some vulnerability tests to identify the level of the vulnerability. In some cases, the vulnerability testing module 135 may comprise a database with references for specific tests the discovery system 105. In some cases, the information obtained from a responsive TCP or UDP packet, may also be stored in a vulnerability testing module 135 in association with the target device type which the information is obtained. The stored information is subsequently used to collect vulnerability information on the target device type, and the vulnerability information is also stored in a database.

Figure 2:
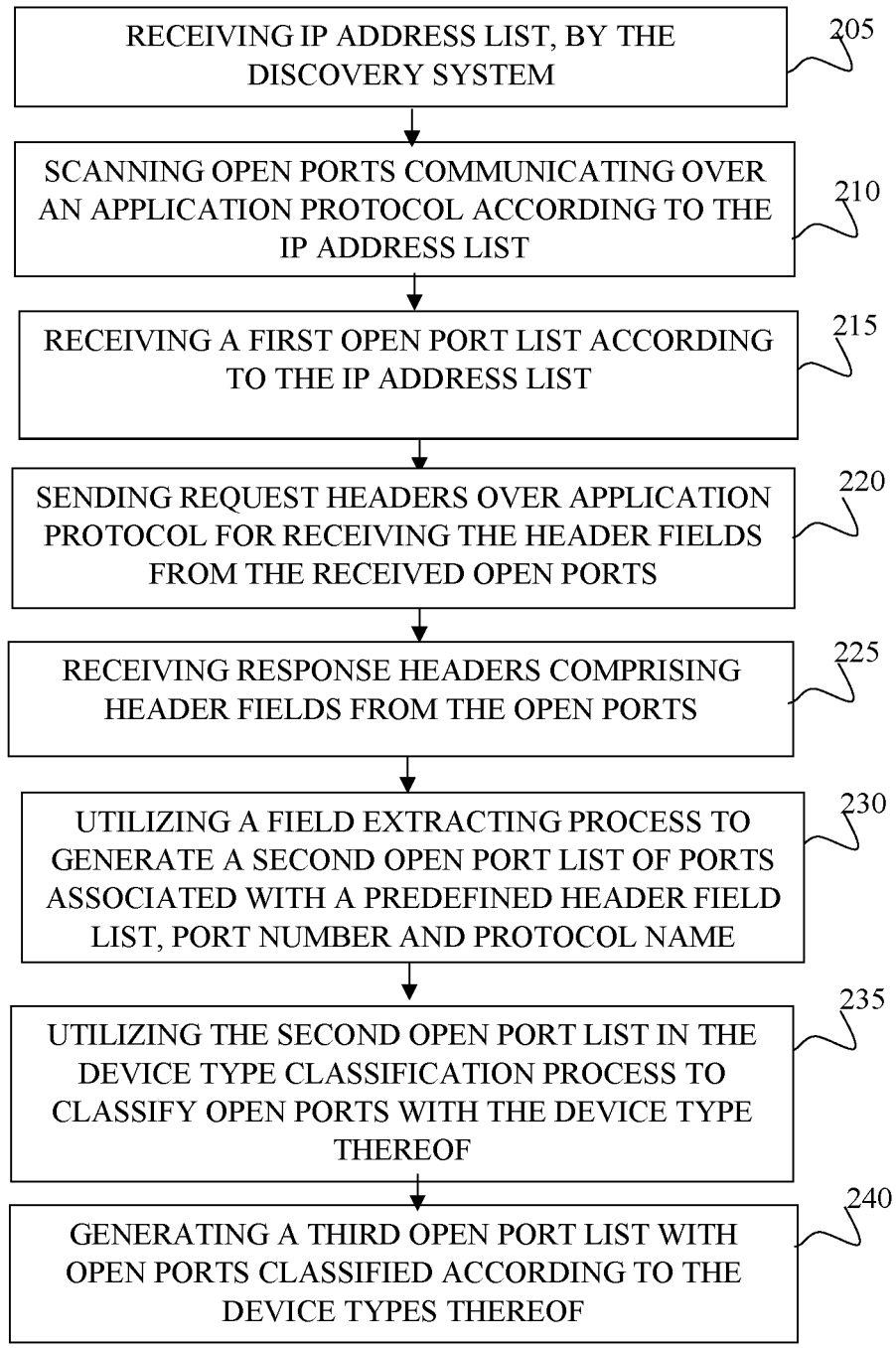
FIG. 2 discloses a process for generating a list of device types associated with a list of open ports for a vulnerability assessment, according exemplary embodiments of the present invention.

FIG. 2 discloses a process for generating a list of device types associated with a list of open ports for a vulnerability assessment, according exemplary embodiments of the present invention. At step 205 a computerized system such as discovery system may receive a range of IP addresses for the vulnerability assessment. In some cases, a user interface allowing a person to select an IP address range may be utilized by the discovery system. In some other cases, the IP addresses may be loaded or updated to the discovery system. Such a loading or updating can be by digital file such as a text file comprising the IP addresses of the network. For example, a person can utilize a computer digital medium such as data storage device, memory stick, memory card, memory, computer parallel communication device, and like, to upload a text file to the discovery system. Such a text file can comprise the IP addresses, or a range of IP addresses. The IP addresses may be IP addresses in a internet-protocol based network.

At step 210 the discovery system operates a port scanning to detect open ports operating in the received internet-protocol address range. Such open ports can be endpoints of communication configured to accept IP communications, also known as IP packets. In some cases, the scanned ports may be represented at the discovery system by port numbers, as aforementioned. Thus, the port scanning operation can be configured to scan a range of IP addresses, and detect the open ports in that IP address range. At step 215 the discovery system receives a first open port list wherein the open ports in the second port list are configured to accept IP packets at the network defined by the received IP addresses. For example, an open port on the network defined by the received IP addresses can accept IP packets addressed to an IP addresses associated with a port number, wherein the addressed IP address is associated with a hardware device and the port number represents a termination of the communication at the hardware device. In some cases, at the end of step 210 the discovery system may structure a first list of open ports operable on the received IP addresses.

At step 220 the discovery system may send a request to at least a portion of the ports in the first open port list for receiving the operating parameters of the network protocol introduced by at least a portion of the open ports in the first open port list. In some cases, the discovery system may send requests based on application protocols with protocol names such as HTTP, HTTPS, RTSP, and the like, to receive the operating parameters of the network protocol. In such cases, the discovery system may send a request header, also known as a request message to the at least a portion of the open ports in the first open port list. At step 225 the discovery system may receive response from the at least a portion of the open ports in the first open port list. In some cases, such responses may be response headers, also known as a response messages comprising header field lists associated with the open ports. The fields in the header field lists may comprise the operating parameters of the network protocol introduced by at least a portion of the open ports in the first open port list. Thus, the ports in the first open port list may be operated by a device configured to operate and communicate over the internet-protocol based network.

For example, the ports in the first open port list can be associated with a specific IP address and a protocol name such as HTTP and be represented by the port number 80 can send a response header comprising fields. The header fields may be structured in a form of attribute/value pairs. For example, a header fields can be structured such as: "Server: Apache", wherein the "server" is the attribute and the "Apache" is the value. One more example can be a header fields can be structured such as: "Content-Length: 1110", wherein the "Content-Length" is the attribute and the "1110" is the value. At the end of step 225 at least a portion of the open ports in the first open port list may be associated with a list of fields representing the operating parameters of the network protocol. For example, a port in the open port list associated with a specific IP address and represented by the port number 443 can be associated with a header comprising multiple header fields, wherein header fields are representing the operating parameters of the network protocol in a form of attribute/value pairs.

At step 230 the discovery system utilizes a process denoted herein as a "field extracting process", as explained below, to associate a header field list comprising predefined attributes for some ports of the first open port list. At the end of step 230 the discovery system generates a second open port list, wherein at least a portion of the ports in the second open port list are associated with data item sets comprising header fields, port number, and protocol name. In some cases, the data item sets associated with the port in the second open port list also comprise key fields. At step 235 the discovery system utilizes a process denoted herein as a "device type classification" to identify the device type to which the port is associated. The device type may be a certain type of electronic device or physical entity configured to communicate over the given network. For example, a surveillance camera communicating over telecommunication network can be a device, wherein the device type may be a surveillance camera. In some cases, the second port list utilized in the "device type classification" may be associated with some of the following items: The elected header fields, key filed, port number, and protocol name. In some cases, the second port list utilized in the "device type classification" may be associated with some of the following items: The elected header fields, port number, and protocol name.

At the end of step 235 the discovery system comprises a second open port list, wherein at least some of the ports in the open port list are also associated with a device type, as explained below. At step 240 the discovery system may generate a third list of open ports, wherein at least a portion of the third open ports are associated with IP address, port number, header fields according to some predefined attributes, and classified according to the device types thereof. For example, a specific port configured to communicate with an HTTP protocol can be associated with the port number 80, with the protocol name HTTP, with a specific device type such as a computerized server, and at least one field structured in a form of attribute/value pairs.

In some cases, the response header utilized by the discovery system can be an HTTP header which can be used in an HTTP response header and which doesn't relate to the content of the message. Response headers, like Age, Location or Server are used to give a more detailed context of the response. As it is known to a person having ordinary skills in the art, not all headers appearing in a response are response headers. For example, the Content-Length header is an entity header referring to the size of the body of the response message. However, these entity requests header are usually called responses headers in the in the context of the present invention.

In some cases, the at the end of step 240, the discovery system may report out the third open port list. In some cases, such a report out may be accomplished by generating text file and output thereof. Such an output may be done by displaying the third open port list in a display device connected to the discovery system. In some other cases, the report out of the third open port list may be by printing the third open port list to a printer. In some other cases, the out of the third open port list may be by storing the third open port list in a computer readable medium.

Figure 3:
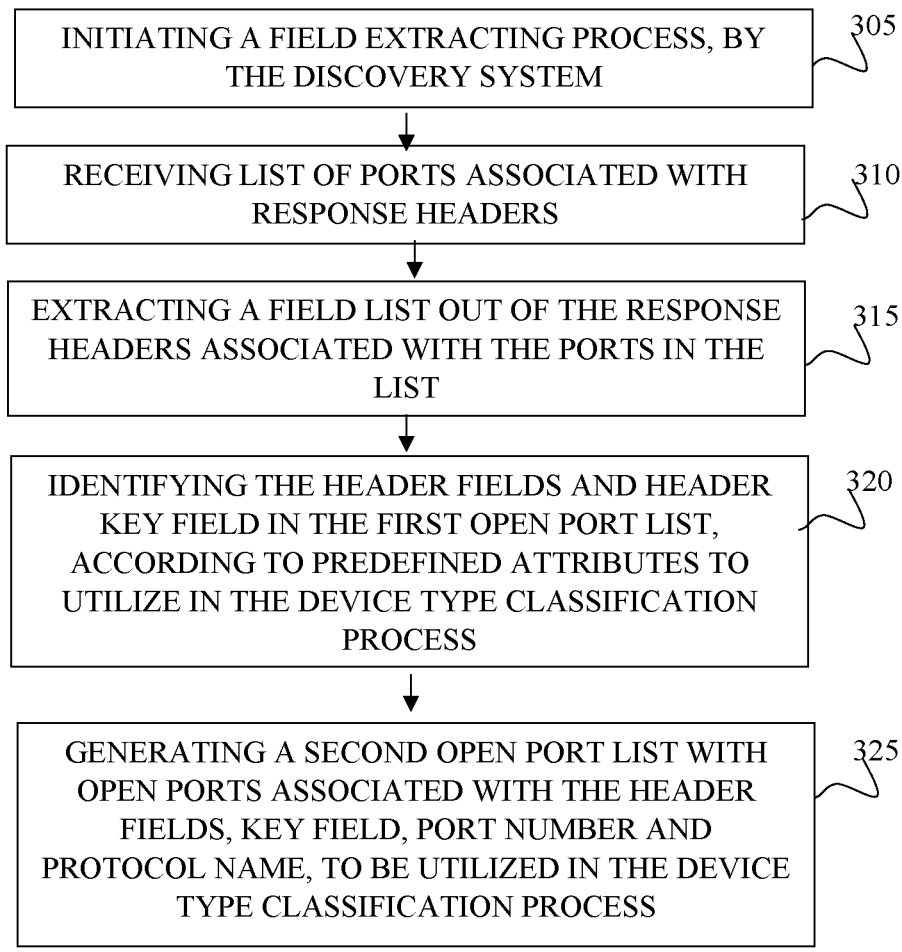
FIG. 3 discloses a process, denoted as field extracting process and operated by the discovery system, designed to associate a list of header fields with ports in the first open port list, according exemplary embodiments of the present invention.

FIG. 3 discloses a process, denoted as field extracting process and operated by the discovery system, designed to associate a list of header fields with ports in the first open port list, according exemplary embodiments of the present invention. At step 305 the discovery system initiates the field extracting process. In some cases, the field extracting process may utilize the first list of open ports associated with response headers comprising header fields. In such cases, the discovery system may associate some header fields to some of the ports in the first open port list, according to a predefine attributes of header fields, as explained below. At step 310 discovery system receives the first open port list, wherein at least some of the port least are associated with response headers. At step 315 the discovery system extracts header fields of the response headers associated with at least some of the ports in the first port list. For example, the discovery system may extract fields such as Server name, Last-Modified, Date, Content-Length and the like from the response headers associated with at least some of the ports in the first port list. In some cases, the discovery system may utilize a computer-readable medium for storing and arranging the extracted header fields. In some cases, the discovery system may utilize an auxiliary database embodied as a set of related data and information organized to allow the operations required for the field extracting process.

At step 320 the discovery system identifies the header required to be utilized in the device type classification, as aforementioned. In such a process the discovery system may define one of the attributes as a key field. For example, the discovery system may identify the header field "Server Name" as the key field. The discovery system may also elect a list of specific header fields among the header fields in the response header to be associated with the ports. For example, the discovery system may extract the following header fields: Server name, Date, Last-Modified, Accept-Ranges, Content-Length and the like from the response header associated with some of the ports in the first open port list. In such an exemplary case, the discovery system may elect the attributes: Server Name and the Content-Length as the attributes of the header fields to be associated with the open ports, and the attributes Server Name as the attributes of the key field.

At step 325 the discovery system generates a second open port list with open ports associated with the header fields, key field, port number and protocol name, to be utilized in the device type classification process.

Figure 4:
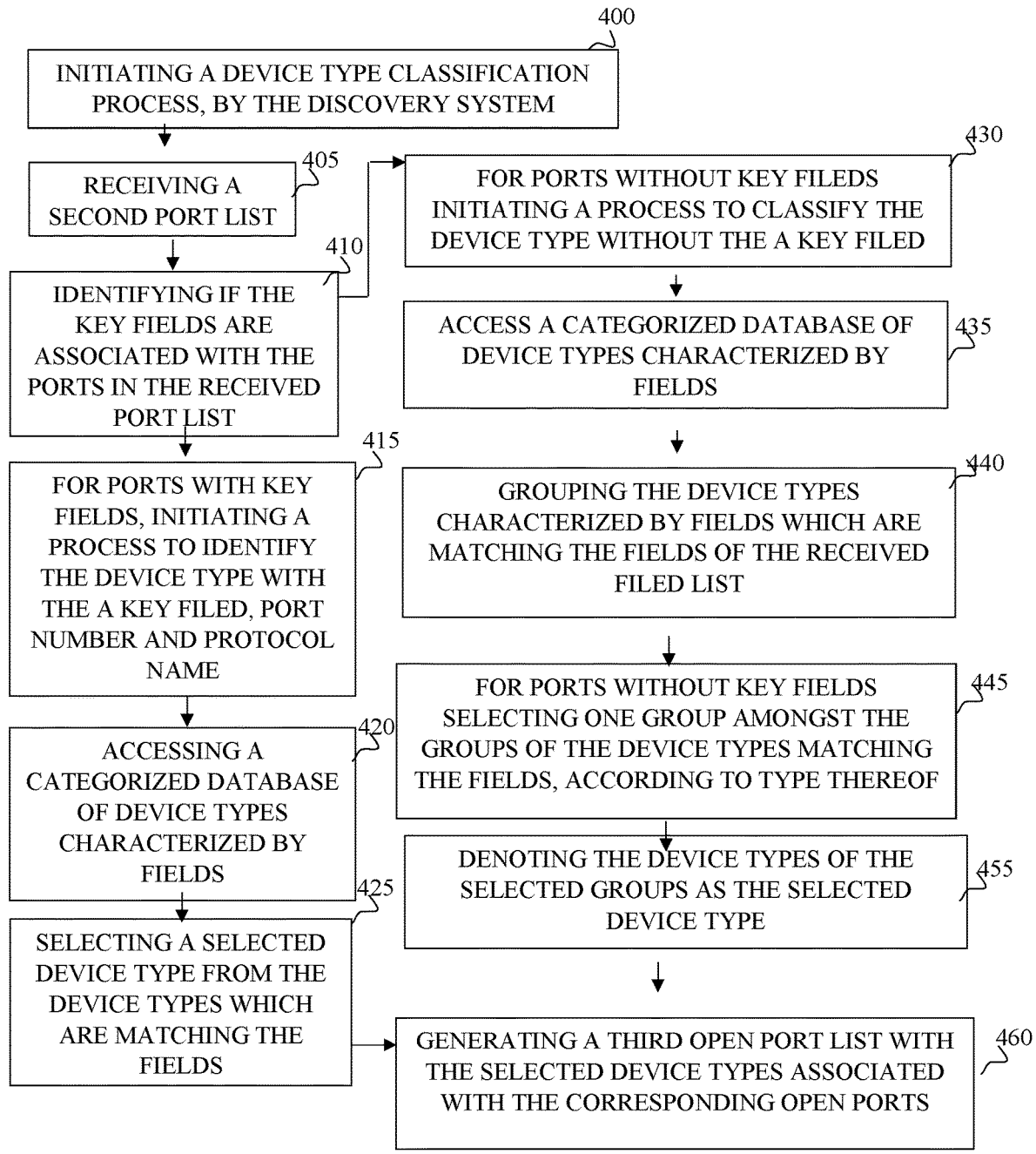
FIG. 4 discloses a process operated by the discovery system, denoted as a "device type classification process" and designed identity the device types and associate thereof to at least some ports in the second open port list, according exemplary embodiments of the present invention.

FIG. 4 discloses a process operated by the discovery system, denoted as a "device type classification process" and designed identity the device types and associate thereof to at least some ports in the second open port list, according exemplary embodiments of the present invention. At step 400 the discovery system initiates a device type classification. In some cases, the device type classification may utilize a list of open ports, such as the second open port list, associated with date item sets comprising header fields, protocol name, port number. In some cases, the device type classification may utilize a list of open ports, such as the second open port list, associated with date item sets comprising header fields, protocol name, port number, and a key field. The discovery system may associate some of the ports in the second open port list with device types. At step 405 the discovery system may receive a second open port list.

At step 410 the discovery system identifies if the key fields are associated with the ports in the received second port list. In such a process the discovery system may be configured to identify the ports in the second open port list associated with key fields, and the port list which are not associated with key fields. At step 415 for the ports associated with key fields the discovery system initiates a process to classify the open ports to device types by utilizing date items sets comprising key fields, port number, header fields, and a protocol name. In such a process, the discovery system may utilize a set of references or a categorized according to device types associated with key fields. For example, a certain key field associated with a specific port number and a protocol name may indicate for a specific device type. At step 420 the discovery system accesses the categorized database to for identifying the device type based on the key fields. Thus, the database can be configured to associate between a device type and key field, associated with header fields, port number, and protocol name. The discovery system may also comprise a process which optimizes the process of classifying the device type according to the header fields. For example, in case the key field comprises the attributes "Content-Type" and the key field matches two device types different from each other, the optimization process can utilize other header fields, and/or the port number, and/or the protocol name to identify the matching device type.

At step 425 the discovery system selects the device types and associates thereof with the corresponding ports. For example, an open port associated with at least header fields, key field, port number, and protocol name, may be classified according to a device type. Such a device type can be a camera, printer, computer storage medium designed to allow access via internet connections, and the like. The discovery system may also generate a list with the open ports classified to device types associated with the open port number, the IP addresses, the header fields. At step 460 the discovery system may generate the third list of the open ports associated with the device types thereof. For example, a certain open port in the third open port list may be associated with the device type, the protocol name, the port number. In some cases, the header fields may also be associated with the open ports in the third open port list.

At step 430 for the ports which are not associated with key fields, the discovery system initiates a process to classify open ports according to the device types by utilizing date item sets comprising at least, port number, header fields and protocol name. At step 435 the discovery system accesses a categorized database to for identifying the device types without utilizing the key fields. At step 440 for the ports without without the key fields, the discovery system may utilize a grouping process for grouping the device types which match at least the port number, the protocol name and the header fields. In such a process, the discovery system may utilize a set of references or database which groups the header fields, the protocol name and the port number according to the device types. The discovery system may comprise a plurality of groups of date items sets comprising, port number, the protocol name and the header fields, wherein the groups are associated with device types, wherein the device types associated to the groups are different from each other. For example, a date item set comprising a port number, protocol name and the header fields can match to a printer and a computerized server and a camera.

At step 445 for the open ports associated with data item sets which do not comprise key fields, the discovery system may select one group amongst the groups matching the port number, the protocol name and the header fields. In such a case, the discovery system may identify one group for a corresponding open port. For example, for a certain open port associated with a data item set which does not comprise a key field the discovery system may identify at least two groups characterized by the header fields, the protocol name and the port number, wherein each group is associated with a device type, and wherein the device types are different from each other. At step 455 the discovery system may select one group for one open port as a matching group and identify the device type associated with the selected group as the device type associated with the open port. At the end of step 455 the discovery system completes to select the device types and associate thereof with the corresponding ports, according to the identified group for each port. At step 460 the discovery system may generate the third list of the open ports associated with the device types thereof. For example, a certain open port in the third open port list may be associated with the device type, the protocol name, the port number. In some cases, the header fields may also be associated with the open ports in the third open port list.

Figure 5:
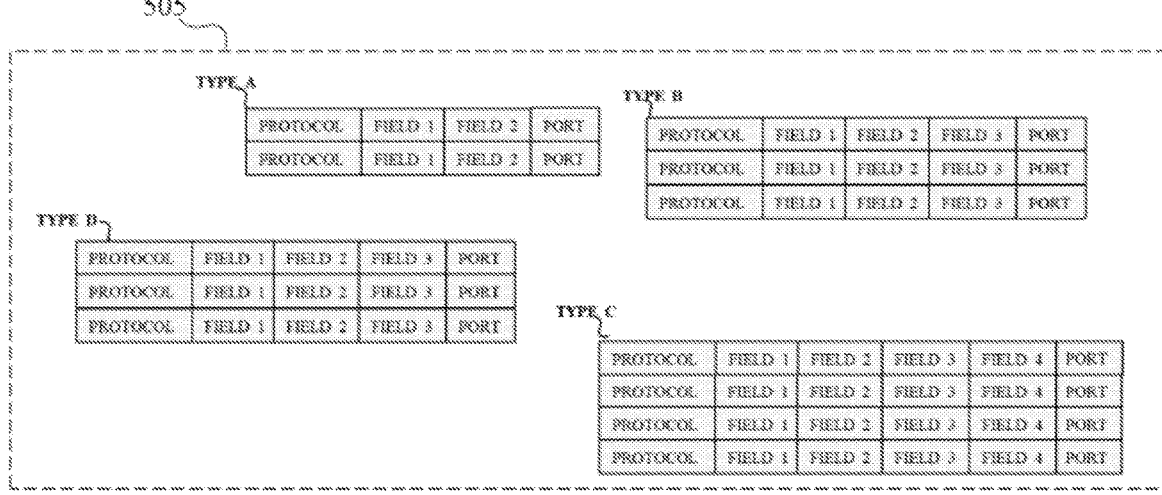
FIG. 5 shows a possible data structure with at least two data sets which can be utilized for selecting the device types in the "device type classification process", according to exemplary embodiments of the present invention.

FIG. 5 shows a possible data structure with at least two data sets which can be utilized for selecting the device types in the "device type classification process", according to exemplary embodiments of the present invention. FIG. 5 shows a data structure 510 which associates device types to date item sets comprising key fields, and also to port number, header fields and protocol name. The data structure 510 can be utilized to identify a device type according to the key field thereof. In some cases, a key field may be match to more than one device type. For example, the same key field can be match to a surveillance camera and a printer. In some cases, wherein the key field matches to more than one device type, the data structure 510 may utilize the header fields, and/or the port number and/or the protocol name for selecting the device type of the corresponding open port.

In such cases, the data structure 510 may be configured to choose one device type. FIG. 5 also shows a data structure 505 which associates device types to data item sets comprising port numbers, header fields and protocol name. Data structure 505 may be configured without the key field. The data structure 505 may also be configured to group the device types with the port numbers, header fields and protocol names thereof. In some cases, a certain device type can be associated with a number of data item sets comprising port numbers, header fields and protocol names. For example, a certain device type can be associated with a plurality of sets of port numbers, header fields and protocol name.

Figure 6:
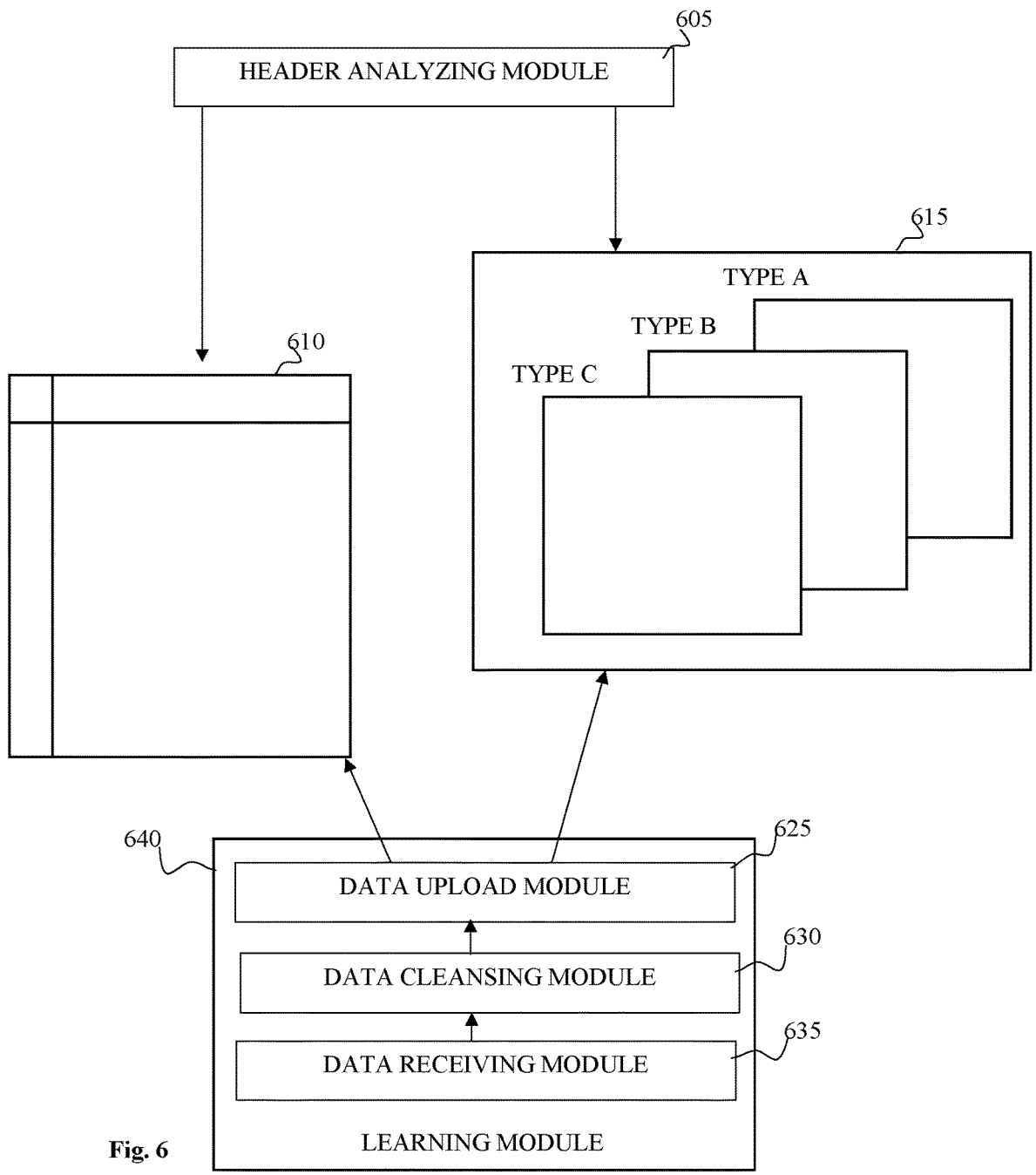
FIG. 6 shows a possible data structure with at least two data item sets which can be utilized for selecting the device types associated with the corresponding open port list and data learning system designed to update said data structure, according to exemplary embodiments of the present invention.

FIG. 6 shows a possible data structure with at least two data item sets which can be utilized for selecting the device types associated with the corresponding open port list and data learning system designed to update said data structure, according to exemplary embodiments of the present invention. FIG. 6 comprises a header analyzing module 605 designed to analyze the response headers and utilize the data structures 610 and 605 for identifying the device types, as aforementioned. The header analyzing module 605 can receive a list of open ports associated with response headers, associate the port number and the protocol name to some ports in the list, and conduct a device type classification with the data structure 615. The header analyzing module 605 can also receive a list of open ports associated with response headers, associate an attribute of a key field, the port number and the protocol name to some ports in the list, and conduct a device type classification with the data structure 610.

Data structure 610 can be configured to associate device types with key fields, and also to port numbers, header fields and protocol names. Data structure 615 can be configured to associate device types with port numbers, header fields and protocol name. Data structure 615 may be configured without the key field. The data structure 615 may also be configured to group the device types according to port numbers, header fields and protocol names. In such cases, the certain device type can be associated with a plurality of port number sets, header fields and protocol names. For example, a certain device type can be associated with a plurality of sets of port numbers, header fields and protocol name.

FIG. 6 also shows a learning module 640 designed to update the data structure 615, and the data structure 610 with additional device types and associate the additional device types with data items. Such data items may comprise, ports numbers, header fields, and the like. The learning module 640 comprises data upload module 625 designed to communicate with the data structures 610, and 615 for the purpose of uploading additional device type and data items. The uploaded data items can be port numbers, protocol names, key fields, and header fields associated with a device type. For example, the data upload module 625 can upload data item sets of: port number, protocol name, header fields associated with a device type to the data structures 615. In some cases, wherein the device type already exists in the data structures 615, the data upload module 625 may associate the newly set of uploaded data items to a device type which already exists. In such case the data upload module 625 may create groups of data item sets of: port number, protocol name, header fields, associated with one device type. For example, a device type such as a camera can be associated to two different sets of port number, protocol name, and header fields. The data upload module 625 can also associate data item sets of: key filed, port number, protocol name, header fields associated with a device type to the data structures 610. For example, the data upload module 625 can associate data item sets of: key filed, port number, protocol name, header fields, with one device type.

The learning module 640 also comprises data cleansing module 630 which can receive sets of data items, remove the unnecessary data items and keep the data item sets of: a key field, port number, protocol name, header fields associated with a device type. In some cases, the association of data item sets with a device type may comprise some logical units designed to identify device types, identify the protocol name and the port number the newly identified device type and add to the data structures 610, and 615. The learning module 640 also comprises a data receiving module 635 configured to receive device types, key fields, port numbers, and the like. The data receiving module 635 may also be configured to capture data items received either manually or automatically by computerized processes, and handover to data cleansing module 630.

Figure 7:
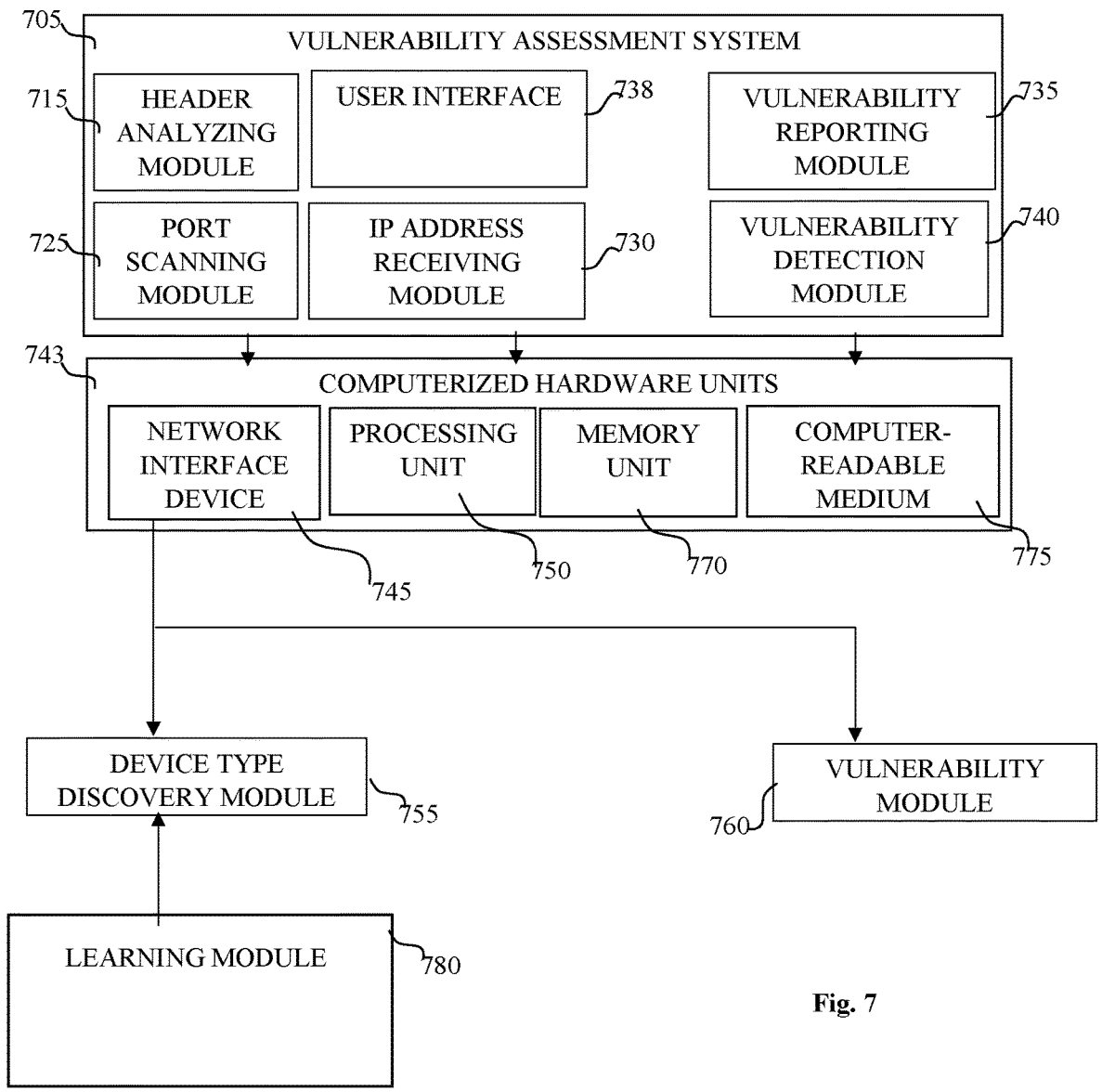
FIG. 7 discloses a discovery system implemented on a computerized device, according to example embodiments of the present invention, according to exemplary embodiments of the present invention.

FIG. 7 discloses a discovery system implemented on a computerized device, according to example embodiments of the present invention, according to exemplary embodiments of the present invention. FIG. 7 shows a discovery system 705 embodied as a software application operable on a computerized device designed to be connected to a network. The discovery system 705 comprises header analyzing module 715 designed to analyze the response headers and utilize the device type discovery module 755 to identify the device types, as aforementioned. The header analyzing module 715 can receive a list of open ports associated with response headers, associate the port number and the protocol name to some ports in the list, and conduct a device type classification with the device type discovery module 755. The header analyzing module 715 can communicate with the port scanning module 725 and receive a list of open ports associated with port numbers and protocol names. The header analyzing module 715 can also receive a list of open ports associated with response headers, associate an attribute of a key field, the port number and the protocol name to some ports in the list, and conduct a device type classification with the device type discovery module 755.

The discovery system 705 also comprises IP addresses module 730 defined to receive a range of IP addresses and send the range of the IP addresses to the port scanning module 725. In some cases, the range of the IP addresses may be associated with protocol names. Thus, the IP addresses module 730 may receive a range of IP addresses, associated with the protocol name and send to the port scanning module 725. In some cases, the port scanning module 725 is designed to receive a range of IP addresses and detect open ports operating in the network defined by the received IP address range. The ports detected by the port scanning module 725 can be endpoints of communication configured to accept IP communications, also known as IP packets. The port scanning module 725 can also be configured to receive an open port list and send request messages for receiving the header fields from the received open ports. For example, the port scanning module 725 can identify an open port on a specific IP address, send thereof a request header over HTTP to the identified open port represented by the number 80, for receiving response headers comprising header fields from said open port. The port scanning module 725 can also be configured to communicate with header analyzing module 715 for the purpose of analyzing the response headers.

The discovery system 705 also comprises a user interface 738 configured to provide the required interface for a person who manage and operate the discovery system 705. In some cases, the user interface 738 may have the required interfaces for receiving a range of IP addresses. In some cases, the user interface 738 may also be configured to communicate with the vulnerability detection module 740 and conduct a vulnerability detection by communicating with a vulnerability module 760. In some cases, the vulnerability module 760 may receive device type associated with a port number, and a protocol name and conduct a testing for evaluate the vulnerability level the open ports provides.

The discovery system 705 may be set of computerized module and processes operable on a computerized device comprising computer hardware units 743 designed to carry out the instructions and tasks of the discovery system 705. The computer hardware units 743 comprises a processing unit 750, comprises at least one digital processor, coupled to a memory unit 770 and computer-readable medium 775. The processing unit 770 can be configured to receive instructions that when executed by the processing unit 750 cause the computer hardware units 743 to operate. For example, in some cases, the processing unit 750 can be instructed to perform a port scanning by the port scanning module 725. In such an exemplary case, the processing unit 750 may operate the network interface device 745 and thereby carry out the port scanning. The network interface device 745 may be a computerized device configured to control the communication of the computer hardware units 743 in a network. In some cases, the network interface device 745 may operate network adapters or physical network interfaces to carry out the communication required for the operation of the discovery system 705. For example, network interface device 745 may control a network interface controller for communicating with computerized devices connected to the network and receive response header therefrom.

Figure 8:
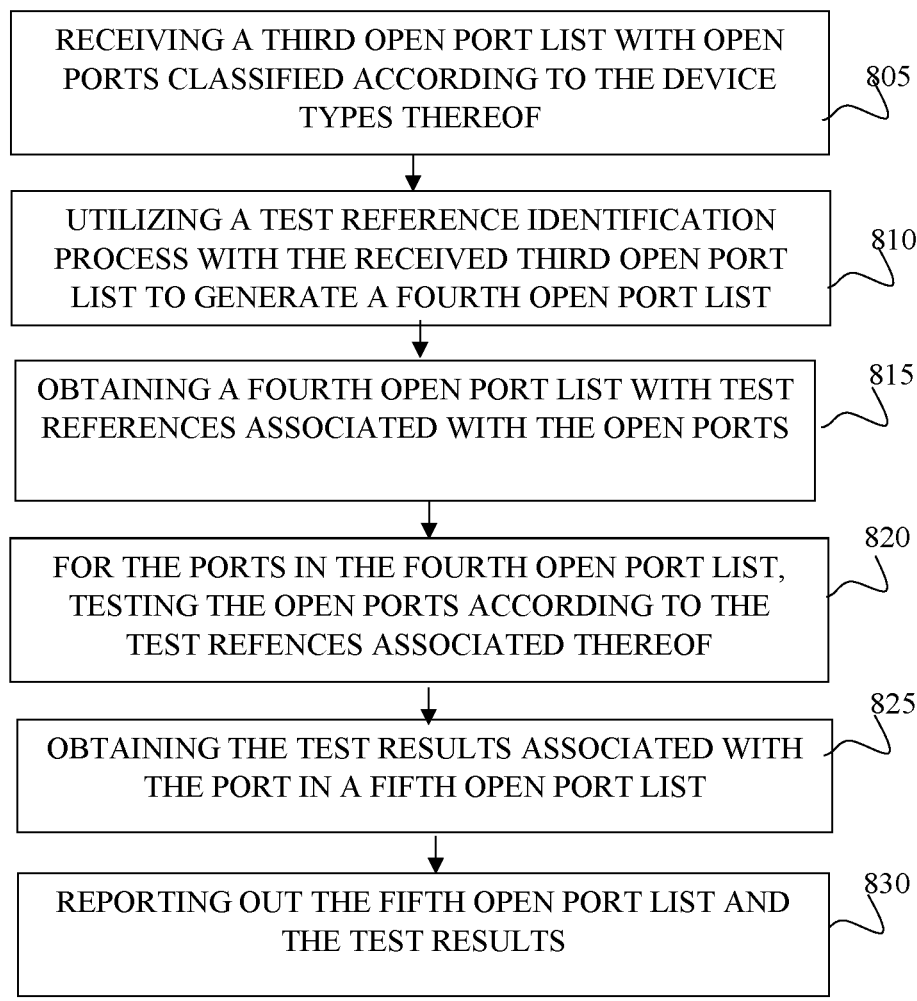
FIG. 8 discloses a process designed to receive an open port list in a given network, test the ports in the open port list, and report out the test results, according exemplary embodiments of the present invention.

FIG. 8 discloses a process designed to receive an open port list in a given network, test the ports in the open port list, and report out the test results, according exemplary embodiments of the present invention. At step 805 a computerized system such as discovery system may receive a third open port list with open ports classified according to the device types thereof. In some cases, the third open port list may be obtained by the discovery system after accomplishing a device type classification process. In some cases, a user interface allowing a person to select a third open port list among some optional third open port lists, may allow obtaining the third open port list.

At step 810 the discovery system utilizes a test reference identification process with the received third open port list to generate a fourth open port list. Such a test reference identification process can identify specific tests the ports in the third open port list may undergo. At step 815 the discovery system may obtain a fourth open port list. Thus, the test reference identification process may end up with a fourth open port list, wherein the ports in the fourth open port list are associated with data item sets comprising inter alia: port numbers, header fields, protocol names, device type, and a test reference, as elaborate below. In some cases, the ports in the fourth open port list may further comprise the key fields. In some embodiments of the present invention, the fourth open port list may be stored by the system as a computer readable digital file which can be utilized by the computerized processes and methods conducted by the discovery system. In some cases, the fourth open port list may be stored in a data based connected and controlled by the discovery system. For example, such a database may be configured to allow and disallow access to the fourth open port list, to the computerized processes conducted by the discovery system.

At step 820 for the ports in the fourth open port list, the discovery system tests the open ports according to the test references associated thereof, as elaborated below. At step 825 the discovery system obtains a fifth open port list, wherein the ports in the fifth open port list are associated with data item sets comprising header fields, internet protocol address, protocol name, port number, device type, test reference and test results. In some cases, the ports in the fifth open port list are associated with data item sets comprising header fields, internet protocol address, protocol name, port number, device type, test reference, key field, and test results.

At step 830 the discovery system reports out the fifth open port list, and the test results. In some cases, such a report out may be accomplished by generating text file and output thereof. Such an output may be done by displaying the fifth open port list in a display device connected to the discovery system. In some other cases, the report out of the fifth open port list may be by printing the fifth open port list to a printer. In some other cases, the out of the fifth open port list may be by storing the fifth open port list in a computer readable medium.

The test result may comprise whether the connections to the port according to test instructions, as explained below, have succeeded. For example, in case a login trail via login-prompt conducted by the discovery system has succeeded the test caused to the discovery system gained access to a computer system by identifying and authenticating process. The test result may indicate that the connection has succeeded, and the system is vulnerable. In some cases, if the discovery system has not gained access to a computer system, the connection has failed, and the system cannot be defined as vulnerable. In some cases, the test results may comprise the server name, the connection type which failed, the port number, the specific test accomplished in the vulnerability assessment.

Figure 9:
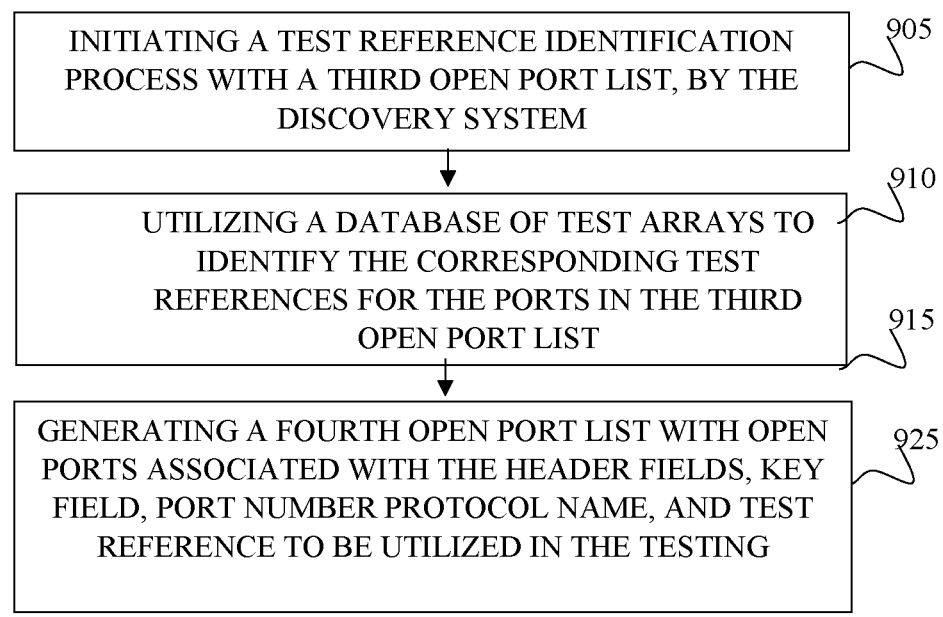
FIG. 9 discloses a process of a test reference identification process designed to identify the required test of an open port in the open port list, according to exemplary embodiments of the present invention.

FIG. 9 discloses a process of a test reference identification process designed to identify the required test of an open port in the open port list, according to exemplary embodiments of the present invention. At step 905 the discovery system initiates the test reference identification process with a third open port list. At step 910 the discovery system utilizes a database comprising device profile associated with test arrays to identify the corresponding test references for the ports in the third open port list. Such a database can be configured to associate test arrays to device profile, wherein the device profile can define the target device to test. A device profile can comprise, multiple fields such as header fields, internet protocol address, protocol name, port number, device type, and the like. In some cases, such a reference may be a numeric value which referring to a specific test array. In some other cases, the reference may be a memory address, symbol, letter, or any other unique identification used by the discovery system to determine the specific test the open port shall undergo. For example, the test reference may be a unique number. Such a number can refer to an array of test instruction relevant to the open port and the device type associated thereof.

At step 925 the discovery system generates a fourth open port list with ports associated with the header fields, key field, port number protocol name, and test reference to be utilized in the testing. In some cases, the test reference may be a memory address or an address in a database, wherein the address directs to a specific test array relevant to the device type, the open port number, the header fields and the like. For example, in case the port number of the open port is 80, one of the header field is Server Name: Serve_Z, and the device type is: printer, one certain number may be chosen by the discovery system to refer a specific test array. In such an exemplary case, If the port number of the open port is 80, one of the header field is Server Name: Serve_X, and the device type is: printer, a different number may be chosen by the discovery system to refer a specific test array.

Figure 10:
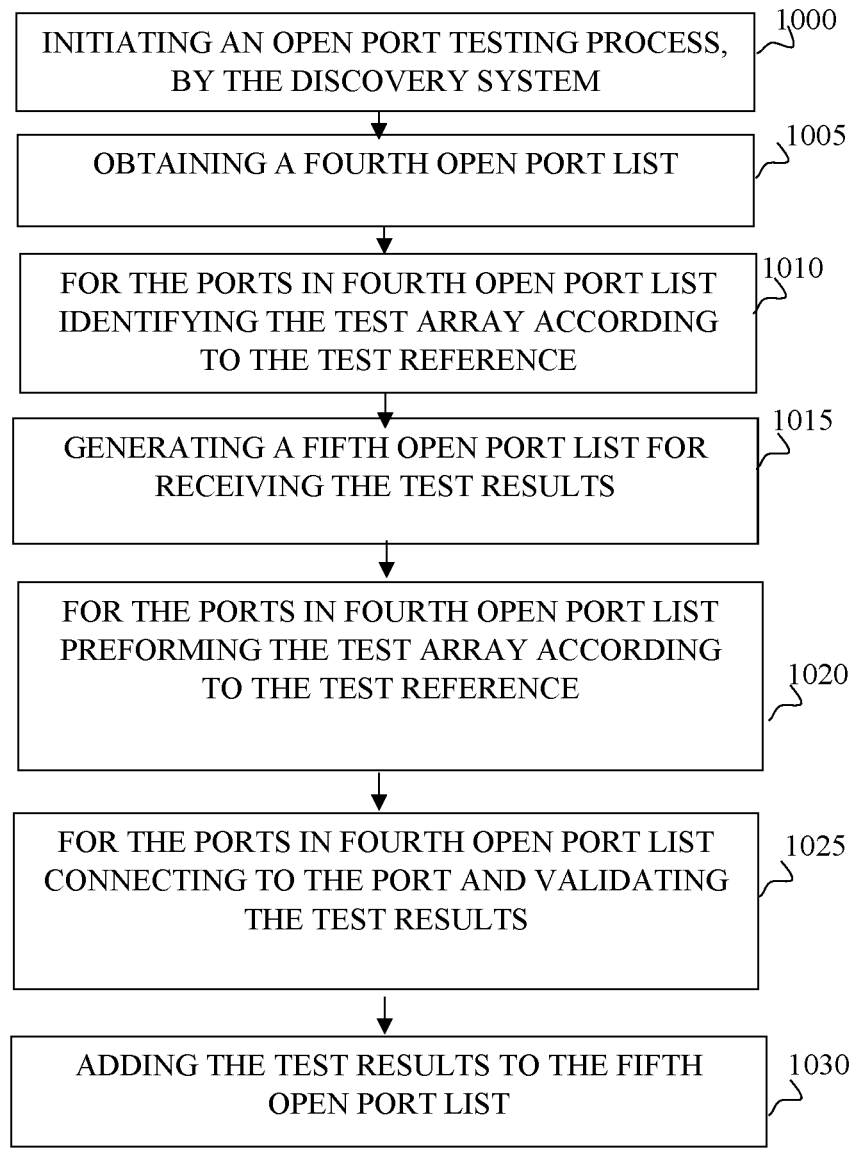
FIG. 10 disloses a process conducted by the discovery system for testing open ports associated with test references, according to exemplary embodiments of the present invention.

FIG. 10 discloses a process conducted by the discovery system for testing open ports associated with test references, according to exemplary embodiments of the present invention. At step 1000 the discovery system initiates an open port testing process. At step 1005 the discovery system obtains a fourth open port list. Wherein the ports in the fourth open port list are associated with data item sets comprising header fields, internet protocol address, protocol name, port number, device type, and test reference. In some cases, the ports in the fourth open port list are associated with data item sets comprising header fields, internet protocol address, protocol name, port number, device type, test reference, and key field.

At step 1010 for the ports in fourth open port list the discovery system identifies a test array according to the test reference. For example, in case the test reference is 102T10, the test array can be a specific test array configured and dedicated for the device type, the port number, the protocol number, the key filed and the like.

At step 1015 the discovery system generates a fifth open port list associated with data sets comprising the header fields, key field, port number protocol name, and test reference for receiving the test results. At step 1020 for the ports in fourth open port list, the discovery system connects to the port and preforms the test array according to the test reference. In some cases, the test array can comprise one test. In some other cases, the test array comprises a set of tests designed to be utilized by the discovery system. For example, the test reference can direct to a test array comprising a brute force attack, wherein the interface for connecting is a login-prompt introduced by an HTML-based interface. The test instruction may also comprise a list of user names associated with password to be utilized in the test. For example, the test instruction may comprise an instruction to utilize the user name: "admin" associated with the password: "123456".

In some cases, the device type may be defined as a shared resource, also known as network share, designed to introduce a computer resource as available from one computerized device to other computerized devices, on a computer network. In such cases, the test instructions can be connecting to the shared resource. In some other cases, the test instructions may also comprise utilization of user name and password for accessing said shared resource.

In some cases, the test instructions may not require any registration, or login to the device. For example, the test instructions may comprise specific instructions adapted to specific device for testing a Denial-of-service attack. In such exemplary case, the instructions can comprise command to request a service, to receive information, and the like, in order to simulate a Denial-of-service attack.

At step 1025 for the ports in fourth open port list, the discovery system connects to the open port and validates the test results of the test. In some cases, the results may be an open communication between the discovery system and the open port. In some cases, the discovery system may send commands to the open port, for validating the results. For example, the discovery system may send a command to a printer to print. The command can be sent via the connection established between the discovery system and the printer operating and controlling an open port tested by the discovery system. In some cases, the testing may comprise processes for gaining access to the device associated with the open port. For example, the test array can comprise some specific instructions to perform a Brute-force attack which calculates possible combination that could make up a password. In some cases, the instruction of the validation of the test results of the test may be defined as part of the test instructions associated with the test arrays.

The discovery system may also test and verify whether the correct password and user-name was guessed. In some cases, a certain test array may comprise dictionaries of user-names and/or password to be used in the Brute-force attack.

At step 1030 the discovery system adds the test results to the fifth open port list. For example, in case a command print was sent successfully, the results are added to the fifth open port list and the vulnerability level may be determine accordingly. In some cases, the test array may comprise a number of tests. For example, a specific test array can comprise instructions to perform dictionary attack according to a password and user name lists associated with the test array, and to send error messages and operational information to check the availability of specific services. For example, the discovery system may be configured to utilize Internet Control Message Protocol for disrupting a service introduced by the divide. In such cases, the results of the test may be added to the fifth open port list.

Figure 11:
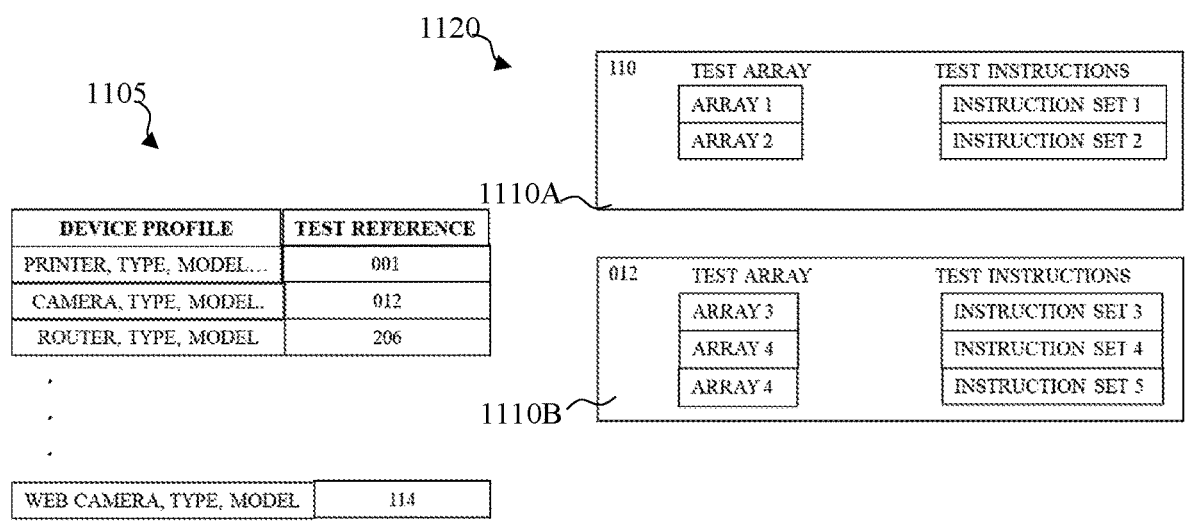
FIG. 11 shows a possible data structure with at least two data sets which can be utilized for identifying the test reference and the test array associated with an open port listed in an open port list, according to exemplary embodiments of the present invention.

FIG. 11 shows a possible data structure with at least two data sets which can be utilized for identifying the test reference and the test array associated with an open port listed in an open port list, according to exemplary embodiments of the present invention. FIG. 11 shows a data set 1105 which associates test references to a device profile, wherein the device profile can define the target device to test. A device profile can comprise, multiple fields such as header fields, internet protocol address, protocol name, port number, device type, and the like. For example, a device printer with a certain open port and a certain protocol name may be associated with the test reference 001. In some cases, a device profile may be subcategorized to diverse subcategories. For example, a printer can be subcategorized to multiple subcategories according to the printer manufacturer. In such cases, the test reference may be different from one subcategory to another. FIG. 11 also shows a data set 1120 which associates test references to test arrays. Data set 1120 comprises testing suite 1110A associated with test reference 110. Hence, in case the discovery system identifies that the test reference is 110, according to the data set 1105, the test utilized by the discovery system are according to the test array 1 and test array 2, with the test instructions 1, and 2. In such cases, the test instructions 1 may be associated with test array 1, and the test instruction 2 may be associated with test array 2.

For example, test array 1 can be an array of Brute-force attacks. The Brute-force attacks of test array 1 may be associated with the Instruction Set 1. The Instruction Set 1 may comprise a number of dictionaries to be used in the attack. The Instruction Set 1 may also comprise the instructions required for communicating with the device for the purpose of signing in, also known as, logging in. For example, in case the device profile is a printer associated with test reference 110, the instruction set in the test instruction of the testing suite 1110A may comprise the required instructions to communicate with the printer over HTTP, and to reach the login-prompt.

Data set 1120 also comprises testing suite 1110B. The testing suite 1110B associated with a test reference 012. Hence, in case the discovery system identifies that the test reference is 012, according to the data set 1105, the test utilized by the discovery system are according to the test array 3, 4 and 5, with the test instructions 3, 4 and 5 accordingly. In such cases, the test instructions 3 may be associated with test array 3, the test instructions 4 may be associated with test array 4 and the test instruction 5 may be associated with test array 5.

Figure 12:
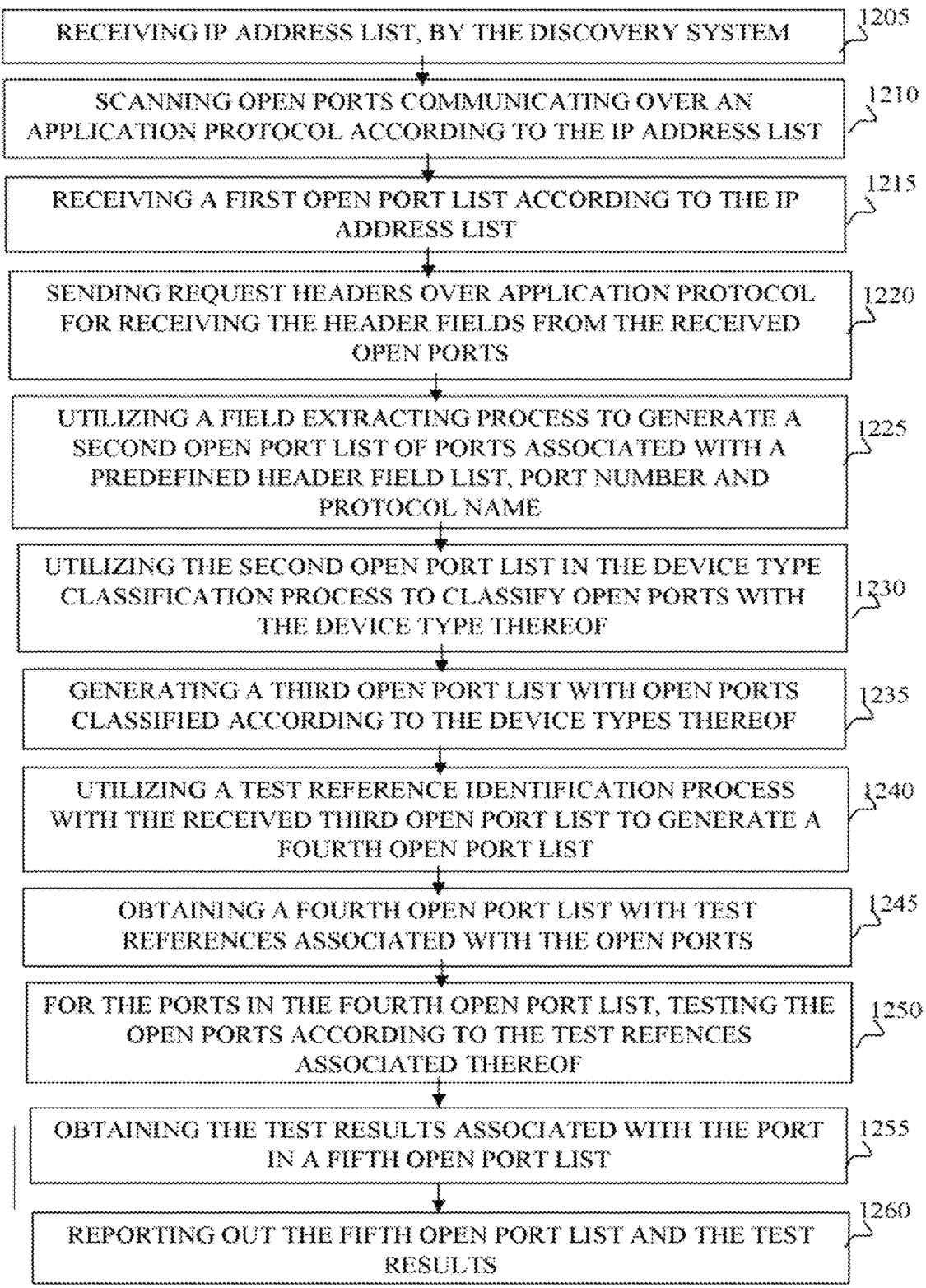
FIG. 12 discloses a process for performing a scan of open ports and preparing a vulnerability assessment, according exemplary embodiments of the present invention.

FIG. 12 discloses a process for performing a scan of open ports and preparing a vulnerability assessment, according exemplary embodiments of the present invention. At step 1205 a computerized system such as discovery system may receive a range of IP addresses for the vulnerability assessment. In some cases, a user interface allowing a person to select an IP address range may be utilized by the discovery system. In some other cases, the IP addresses may be loaded or updated to the discovery system. Such a loading or updating can be by digital file such as a text file comprising the IP addresses of the network. For example, a person can utilize a computer digital medium such as data storage device, memory stick, memory card, memory, computer parallel communication device, and like, to upload a text file to the discovery system. Such a text file can comprise the IP addresses, or a range of IP addresses.

At step 1210 the discovery system operates a port scanning to detect open ports operable in the received IP address range. Such open ports can be endpoints of communication configured to accept IP communications, also known as IP packets. In some cases, the scanned ports may be represented at the discovery system by port numbers, as aforementioned. Thus, the port scanning process can be configured to scan a range of IP addresses, and detect the open ports in that IP address range. At step 1215 the discovery system receives a first open port list wherein the ports in the second port list are configured to accept IP packets at the network defined by the received IP addresses. For example, an open port on the network defined by the received IP addresses can accept IP packets addressed to an IP addresses associated with a port number, wherein the addressed IP address is associated with a hardware device and the port number represents a termination of the communication at the hardware device. In some cases, at the end of step 1215 the discovery system may structure a first list of open ports operable on the received IP address range.

At step 1220 the discovery system may send a request to at least a portion of the ports in the first open port list for receiving the operating parameters of the network protocol introduced by at least a portion of the ports in the first open port list. In some cases, the discovery system may send requests based on application protocols with protocol names such as HTTP, HTTPS, RTSP, and the like, to receive the operating parameters of the network protocol. In such cases, the discovery system may send a request header, also known as a request message to the at least a portion of the ports in the first open port list. At step 1225 the discovery system utilizes a process denoted herein as a "field extracting process", as aforementioned, to associate a header field list comprising predefined attributes for some ports of the first open port list. At the end of step 1225 the discovery system generates a second open port list, wherein at least a portion of the ports in the second open port list are associated with data item sets comprising header fields, port number, and protocol name. In some cases, the data item sets associated with the port in the second open port list also comprise key fields.

At step 1230 the discovery system utilizes a process denoted herein as a "device type classification" to identify the device type to which the port is associated. The device type may be a certain type of electronic device or physical entity configured to communicate over the given network. For example, a surveillance camera communicating over telecommunication network can be a device, wherein the device type may be a surveillance camera. In some cases, the second port list utilized in the "device type classification" may be associated with some of the following items: The elected header fields, key filed, port number, and protocol name. In some cases, the second port list utilized in the "device type classification" may be associated with some of the following items: The elected header fields, port number, and protocol name.

At the end of step 1230 the discovery system comprises a second open port list, wherein at least some of the ports in the open port list are also associated with a device type, as aforementioned. At step 1235 the discovery system may generate a third list of open ports, wherein at least a portion of the third open ports are associated with IP address, port number, header fields according to some predefined attributes, and classified according to the device types thereof. For example, a specific port configured to communicate with an HTTP protocol can be associated with the port number 80, with the protocol name HTTP, with a specific device type such as a computerized server, and at least one field structured in a form of attribute/value pairs. At step 1240 the discovery system utilizes a test reference identification process with the received third open port list to generate a fourth open port list. Such a test reference identification process can identify the specific test ports in the third open port list may undergo.

At step 1245 the discovery system may obtain a fourth open port list. Thus, the test reference identification process may end up with a fourth open port list, wherein the ports in the fourth open port list are associated with data item sets comprising inter alia: port numbers, header fields, protocol names, device type, and a test reference, as aforementioned. In some cases, the ports in the fourth open port list may further comprise the key fields. In some embodiments of the present invention, the fourth open port list may be stored by the system as a computer readable digital file which can be utilized by the computerized processes and methods conducted by the discovery system. In some cases, the fourth open port list may be stored in a data based connected and controlled by the discovery system. For example, such a database may be configured to allow and disallow access to the fourth open port list, to the computerized processes conducted by the discovery system.

At step 1250 for the ports in the fourth open port list, the discovery system tests the open ports according to the test references associated thereof, as aforementioned. At step 1250 the discovery system obtains a fifth open port list, wherein the ports in the fifth open port list are associated with data item sets comprising header fields, internet protocol address, protocol name, port number, device type, test reference and test results. In some cases, the ports in the fifth open port list are associated with data item sets comprising header fields, internet protocol address, protocol name, port number, device type, test reference, key field, and test results.

At step 1255 for the ports in the fourth open port list, the discovery system tests the open ports according to the test references associated thereof. At step 1255 the discovery system obtains a fifth open port list, wherein the ports in the fifth open port list are associated with data item sets comprising header fields, internet protocol address, protocol name, port number, device type, test reference and test results. In some cases, the ports in the fifth open port list are associated with data item sets comprising header fields, internet protocol address, protocol name, port number, device type, test reference, key field, and test results.

At step 1260 the discovery system reports out the fifth open port list, and the test results. In some cases, such a report out may be accomplished by generating text file and output thereof. Such an output may be done by displaying the fifth open port list in a display device connected to the discovery system. In some other cases, the out of the fifth open port list may be by printing the fifth open port list to a printer. In some other cases, the out of the fifth open port list may be by storing the fifth open port list in a computer readable medium.

EXAMPLES

Example 1

In a certain response header, the table below can present the header fields:

HTTP/1.1 200 OK
Date: Mon, 11 Feb. 2019 21:00:40 EST
Server Name: Apache/2.4.18 (Unix)
Last-Modified: Thu, 24 Apr. 2018 15:20:14 PST
ETag: "1988-69c-123a4bc6"
Accept-Ranges: bytes
Content-Length: 1110
Content-Type: text/html Example 2

In some cases, a device type can be matched with more than one data item sets. As elaborated at FIG. 5. The following example shows cases wherein a device type can be grouped with more than one data item set.

A camera, denoted as Camera AX designed to communicate over TCP/IP network can be grouped with the following data item sets:

| CAMERA AX | | | |
|---|---|---|---|
| FIELD 1 | FIELD 2 | PORT NUMBER | PROTOCOL NAME |
| Content-Length: 1100 | Content-Type: HTML | 80 | HTTP |
| Content-Length: 1111 | Content-Type: TEXT | 443 | HTTPS |

In example 2, an open port at the second open port list associated with data item set: Content-Length: 1100, Content-Type: HTML, 80, HTTP, and an open port at the second open port list associated with data item set: Content-Length: 1111, Content-Type: TEXT, 443, HTTPS may yield the device type Camera AX.

Example 3

In some cases, a device type can be associated with test 1 for the testing. The test 1 may be associated with the test array 1 and test instructions 1.

In such a case, the test 1 may be associated with a device type camera of a manufacture called Camera XZA Camera XZA Test 1

Test 1 may refer to test array 1 which comprises the test brute force with the value dictionary attack. The test instructions 1 may comprise the login instructions, and commands required to reach the login-prompt. The test instructions 1 may also comprise a dictionary required for the user name and passwords which may utilized in case of a camera: Camera XZA.

Example 4

In some cases, wherein the device type is a router, the discovery system may utilize the following instructions to check test results, as defined above in step 1025.
1) The discovery system executes a GET HTTP request
2) The GET request may compose the complete URL, the destination address, the port number, and the like.
3) The discovery system receives the response.
4) The discovery system analyzes the response and identify whether the connection to the can be converted to the text with which we determine whether the connection to the device via the open port was successful, or not.

Example 5

In some cases, wherein the device type is a shared resource, also known as network share, designed to introduce a computer resource as available from one computerized device to other computerized devices, on a computer network. In such cases checking the test results, as describe in step 1025 may comprise:
1) The discovery system connects to the shared resource, e.g., utilizing Server Message Block networking protocol to connect the open port as defined in the fourth open port list.
2) The discovery system receives an object to utilize for connecting the shared resources.
3) The discovery system utilizes the received object to access to the shared resource
4) The discovery system utilizes some basic computer commands to verify whether connection was successful or not. E.g., list the discovery system uses a command to get the list of the folder names in the shared resource.

Example 6

In some cases, the discovery system may determine the vulnerability level according to the test results. In such case the discovery system may receive a test results which test simulates a person connecting to a router. The vulnerability levels may be as the following
1) Connecting successfully to the router with the username: "admin" and the password: "admin"=HIGH vulnerability level
2) Connecting successfully to the router with the username: "administrator" and the password: "admin123!"=MEDIUM vulnerability level
3) Connecting unsuccessfully to the router with the username: "admin" and the password: "admin"=LOW vulnerability level.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A discovery system comprising:
at least one computerized device connected to an internet-protocol based network, wherein the computerized device is configured to operate a scan on an internet-protocol address range defined on the internet-protocol based network, for detecting open ports available for communication in the internet-protocol address range, wherein the at least at least one computerized device comprising at least one processing unit coupled with at least one memory unit, and wherein the at least one processing unit is configured with the instructions to:
receive the internet-protocol address range;
operate a scan for the open ports available for communication in the internet-protocol address range, wherein the scan operation is configured to be performed via at least one network interface device coupled with the at least one computerized device, and wherein the at least one network interface device is configured to communicate in the internet-protocol address range;
generate a first open port list of the open ports available for communication in the internet-protocol address range;
send request headers over an application protocol to ports in the first open port list for receiving back the header fields from the ports to which the request headers sent;
receive response headers comprising header fields from open ports available for communication in the internet-protocol address range, wherein the open ports are operated by devices operating in said in the internet-protocol address range;
extract field headers associated with the responded open ports, wherein the filed headers are extracted from the response headers received from the open ports operated by said devices;
generate a second open port list comprising ports from the first open port list, wherein the ports from the second open port list are associated with header fields, port numbers, protocol names;
utilize a data structure and the header fields to identify device types, wherein the device types are the types of the devices operating the open ports;
generate a third open port list comprising ports from the second open port list, wherein the ports in the third open port list are associated with header fields, port numbers, protocol names, and device type;
output the third open port list.

2. The discovery system of claim 1, wherein the ports in the second open port list are further associated with a key field.

3. The discovery system of claim 2, wherein the key filed is used by the discovery system to identify device types.

4. The discovery system of claim 1, wherein the output of the third open port list is to a text file.

5. The discovery system of claim 1, wherein the output of the third open port list is to a computer-readable medium.

6. The discovery system of claim 1, wherein the data structure utilized to identify the device types comprises a learning module designed to update the data structure with additional device types.

7. The discovery system of claim 6, wherein the learning module is further designed to associate the additional device types with data items, wherein the data items comprise port numbers, protocol names, key fields, and header fields.

8. A method operable by a discovery system configured to scan an internet-protocol address range defined in an internet-protocol based network and detect open ports available for communication, wherein the discovery system comprises at least one computerized device connected to an internet-protocol based network, and wherein the at least at least one computerized device comprising at least one processing unit coupled with at least one memory unit, and wherein the method comprising:
receiving the internet-protocol address range;
operating a scan for the open ports available for communication in the internet-protocol address range, wherein the operation of the scan is performed via at least one network interface device coupled with the at least one computerized device, and wherein the at least one network interface device is configured to communicate in the internet-protocol address range;

generating a first open port list of the open ports available for communication in the internet-protocol address range;

sending request headers over an application protocol to ports in the first open port list for receiving back the header fields from the ports to which the request headers sent;

receiving response headers comprising header fields from open ports available for communication in the internet-protocol address range, wherein the open ports are operated by devices operating in the internet-protocol address range;

extracting field headers associated with the responded open ports, wherein the filed headers are extracted from the response headers received from the open ports operated by said devices;

generating a second open port list comprising ports from the first open port list, wherein the ports from the second open port list are also associated with header fields, port numbers, and protocol names;

identifying device types by utilizing the header fields in a data structure to, wherein the device types are the types of the devices operating the ports in the second open port list;

generating a third open port list comprising ports from the second open port list, wherein the ports in the third open port list are associated with header fields, port numbers, protocol names, and device type;

outputting the third open port list.

9. The method of claim 8, wherein associating the ports in the second open port list further comprises associating the ports in the second open port list with a key field.

10. The method of claim 9, wherein identifying device types further comprises utilizing the key filed.

11. The method of claim 8, wherein the outputting of the third open port list is to a text file.

12. The method of claim 8, wherein the outputting of the third open port list is to a computer-readable medium.

13. A discovery system comprising:

at least one computerized device connected to an internet-protocol based network, wherein the computerized device is configured to receive a third open port list of ports available for communication in an internet-protocol address range, detect open ports and identify variability levels thereof, wherein the at least one computerized device comprising at least one processing unit coupled with at least one memory unit, wherein the at least one processing unit is configured with the instructions to:

receive the third open port list, wherein the ports in the third open port list are associated with header fields, port numbers, protocol names, and device type;

identify test references for the ports in the third open port list, by utilizing a data structure comprises test references associated with test arrays associated with test instruction sets;

generate a fourth open port list from the third open port list by associating test references to the port in the third open port list;

for the ports in the fourth port list conduct tests, according to the test references associated with the ports in the fourth port list;

communicate with the ports in the fourth open port list and verify the test results, according to the instruction sets associated with the test arrays associated with the test reference associated with the ports in the fourth open port list;

generate a fifth open port list by associating the test results and the vulnerability levels to the ports in the fifth open port list;

output the fifth open port list.

14. The discovery system of claim 13, wherein the vulnerability levels of the ports in the fifth open port list are determined by the test results conducted for the ports in the fourth port list.

15. A method operable by a discovery system configured to receive a third open port list of ports available for communication in an internet-protocol address range defended in an internet-protocol based network, and identify variability levels thereof, wherein the discovery system comprises at least one computerized device connected to an internet-protocol based network, and wherein the at least one computerized device comprising at least one processing unit coupled with at least one memory unit, and wherein the method, comprising:

receiving the third open port list, wherein the ports in the third open port list are associated with header fields, port numbers, protocol names, and device type;

identifying test references for the ports in the third open port list, by utilizing a data structure comprises test references associated with test arrays associated with test instruction sets;

generating a fourth open port list from the third open port list by associating test references to the port in the third open port list;

for the ports in the fourth port list conducting tests, according to the test references associated with the ports in the fourth port list;

communicating with the ports in the fourth open port list and verify the test results, according to the instruction sets associated with the test arrays associated with the test reference associated with the ports in the fourth open port list;

generating a fifth open port list by associating the test results and the vulnerability levels to the ports in the fifth open port list;

output the fifth open port list.

16. The discovery system of claim 15, wherein the vulnerability levels of the ports in the fifth open port list are determined by the test results conducted for the ports in the fourth port list.

* * * * *